United States Patent [19]

Gelardi et al.

[11] Patent Number: 4,993,655
[45] Date of Patent: Feb. 19, 1991

[54] ONE-PIECE TAPE REEL

[75] Inventors: Anthony L. Gelardi, Cape Porpoise; Craig Lovecky, Old Orchard Beach, both of Me.; Alan Lowery, Canton, Mass.; Robert Barstow, Alfred, Me.

[73] Assignee: Shape Inc., Biddeford, Me.

[21] Appl. No.: 442,167

[22] Filed: Nov. 28, 1989

[51] Int. Cl.⁵ .................................... B65H 75/18
[52] U.S. Cl. ............................ 242/71.8; 242/71.9; 242/197
[58] Field of Search ............ 242/71.8, 71.9, 68, 242/197, 199; 220/339

[56] References Cited

U.S. PATENT DOCUMENTS

| 754,117 | 3/1904 | Bedworth | 242/71.8 |
| 1,073,110 | 9/1913 | Fairchild | 242/71.8 |
| 2,458,383 | 2/1946 | Isaac | 242/71.8 |
| 3,695,541 | 10/1972 | Lee | 242/71.8 |
| 3,856,228 | 12/1974 | Hasono et al. | 242/71.8 |
| 3,892,370 | 7/1975 | Nelson | 242/71.8 |
| 3,993,262 | 11/1976 | Longworth | 242/71.8 |
| 4,452,404 | 6/1983 | Gelardi et al. | 242/71.8 |
| 4,505,404 | 3/1985 | Perchak et al. | 220/339 |
| 4,564,156 | 1/1986 | Cybulski | 242/71.8 X |
| 4,606,511 | 8/1986 | Machida | 242/71.8 |
| 4,664,328 | 5/1987 | Yamada | 242/71.8 |
| 4,723,731 | 2/1988 | Posso | 242/197 |
| 4,807,826 | 2/1989 | Iwahashi | 242/71.8 |

FOREIGN PATENT DOCUMENTS 6812 of 1910 United Kingdom ............ 242/71.8

Primary Examiner—William A. Cuchlinski, Jr.
Assistant Examiner—Joseph A. Rhoa
Attorney, Agent, or Firm—Staas & Halsey

[57] ABSTRACT

A tape reel is described which is a one-piece, integrally, molded member. A planar continuous flange is connected to a central hub. A plurality of petals or ears is molded in an upright condition to be movably connected to the upper end of the hub. The ears are pushed down to be parallel with the plane of the lower flange to receive tape. The ears are held in place by cooperating members formed on both the ears and hub. Finally, a friction button can be formed separately and assembled on the hub, or may be integrally molded of the hub.

23 Claims, 3 Drawing Sheets

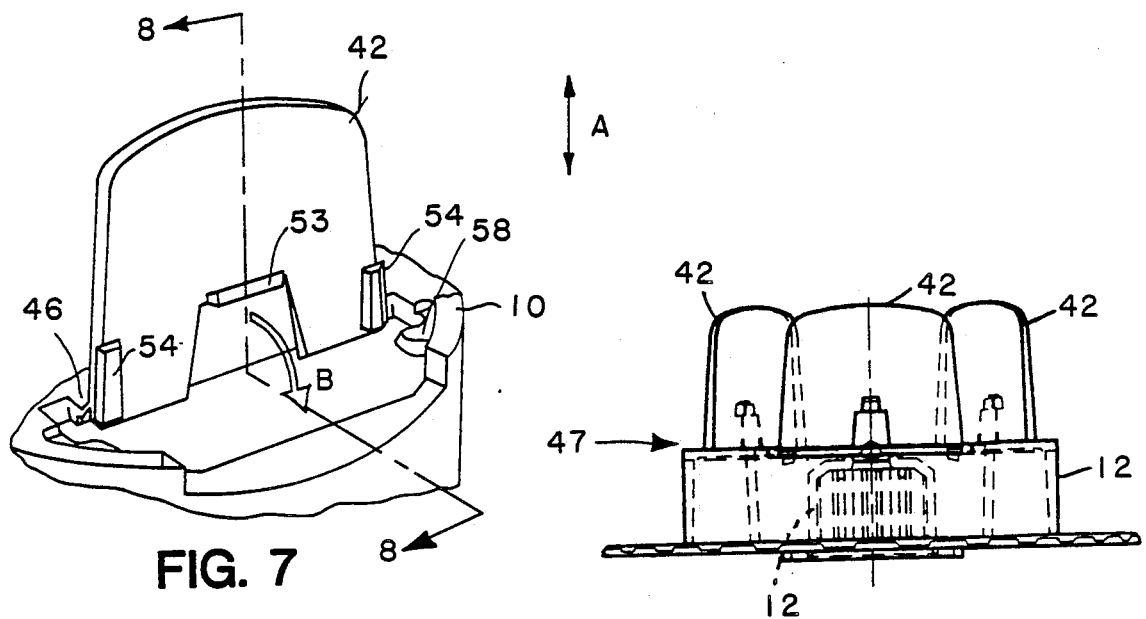
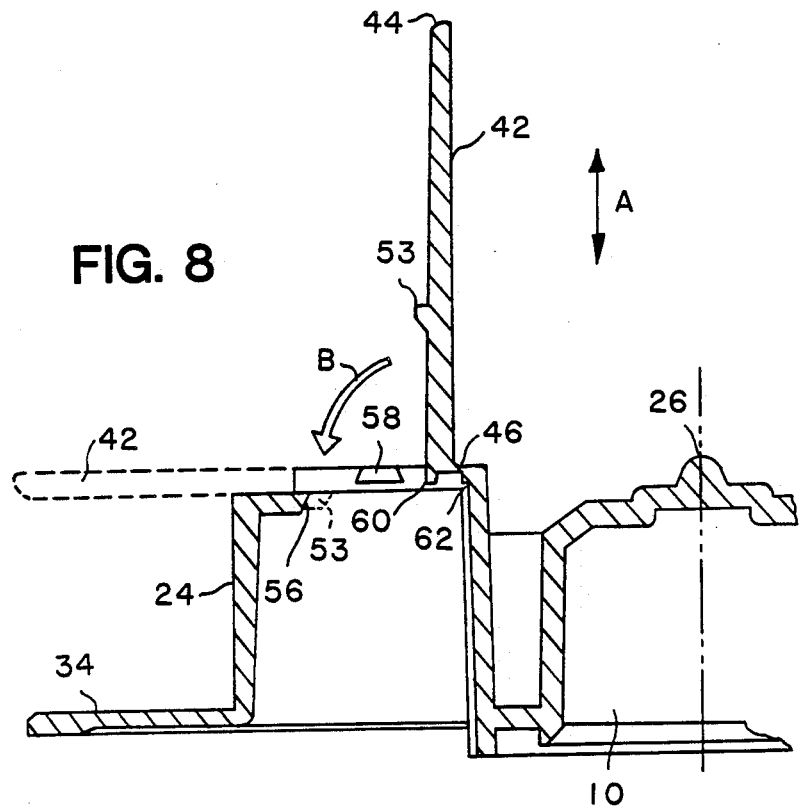

ONE-PIECE TAPE REEL

BACKGROUND OF THE INVENTION

This invention relates to tape reels and, more particularly, to one-piece tape reels for video cassette cartridges.

As described in Assignee's U.S. Pat. No. 4,452,404, and the references cited therein, a tape cassette usually includes a cover, a base and at least one tape reel therebetween. The tape reel usually includes a lower flange, an upper flange, and a hub which is connected centrally between the two flanges. The lower flange can be a separate member connected to the hub, or can be integrally formed with the hub. However, the upper flange is separate and usually connected to the hub by lugs formed on the hub which pass through holes formed in the upper flange. The lugs are then heat deformed, welded or cam locked to hold the upper flange in position relative to the hub. Finally, the hub usually includes centrally of its top surface a pivot button, again either formed separately or integrally therewith. At least the pivot button must be made of a low friction material such as acetal. Thus, with the conventional tape reel, at least two and perhaps four component parts must be produced and assembled.

This type of tape reel is currently widely used because it operates effectively and the manufacturing thereof is not very complicated. However, due to the fact that this conventional tape reel includes several parts that must be separately produced and assembled during manufacture, this tape reel is relatively expensive to manufacture. More particularly, the molding, inventory, assembly and manufacturing yields to make a 2-4 piece tape reel, as well as the difficulty in handling by automation a separate pivot button, lead to relatively expensive production costs.

One piece tape reels have been proposed for minimizing the relatively high manufacturing costs associated with multi-piece tape reels; however, they have not been successful for several reasons. These one-piece tape reels include a hub and upper and lower continuous, planar flanges, all as one piece, requiring a mold which uses side action molding procedures known in the art. Side action causes parting lines to be formed on the tape winding surface of the tape reel, i.e., the hub core outer diameter. Parting lines become an increasing problem as the mold ages. Such parting lines interfere with reliable tape winding and disadvantageously effect tape performance. That is, defects in the surface profile of the core has been known to be related to poor tape performance, dropouts and loss of signal. Further, side action requires large and costly molds which must be run on correspondingly large and costly injection molding machines.

In summary of the prior art, the multi-piece tape reel operates rather efficiently and has been almost unanimously adopted by the industry, but same is relatively expensive to make. On the other hand, one-piece tape reels are aimed at lowering expenses, but interfere with proper tape winding. Therefore, a need exists for an efficiently operating tape reel which is less expensive to make.

SUMMARY OF THE INVENTION

Accordingly, it is an object of the present invention to provide a tape reel which is less costly to manufacture because it requires no production or assembly of separate parts.

It is another object of the present invention to provide a tape reel which ensures proper winding of tape thereon.

It is another object of the present invention to provide a tape reel which can be molded in one-piece, without the danger of tool marks being formed on the hub core outer diameter.

Finally, it is an object of the present invention to provide a molded, one-piece tape reel and a related video cassette, which are economical to make and operate efficiently.

To achieve the foregoing and other objects of the present invention and in accordance with the purposes of the invention there is provided a tape reel which is a one-piece, integrally molded member, including: a lower, planar, continuous flange; a central hub connected to the lower flange; and, instead of the conventional upper, planar continuous flange attached to the hub, a plurality of petals or ears which are each movably connected to the upper surface of the hub by a living hinge. The ears are molded in an upright and perpendicular position relative to the plane of the lower flange and are pushed down into an operational position to be parallel with the plane of the lower flange. The ears are held in the operational position by cooperating, fastening members formed on both the ear and hub. Finally, a friction button can be formed separately and assembled on the hub, as described in the above-referenced U.S. Pat. No. 4,452,404, or may be integrally molded of the hub.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG 7 is a detailed, perspective view of an alternate embodiment according to the present invention, in the molded condition.

FIG. 8 is a cross-sectional view of the tape reel shown in FIG. 7, taken along line 8—8.

FIG. 9 is a side view of an alternate embodiment according to the present invention, illustrating particularly three movable ears, each including fastening means.

DETAILED DESCRIPTION OF THE PREFERRED EMBODIMENTS

The preferred embodiments according to the present invention will now be described with reference to FIGS. 1-8.

Figure 1:
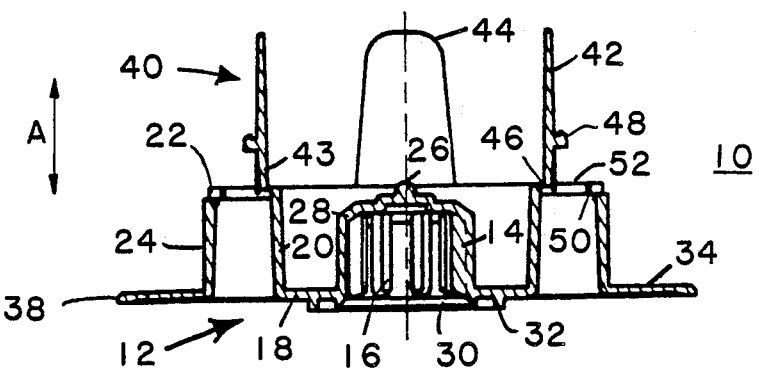
FIG. 1 is a side, cross sectional view illustrating one embodiment of the one-piece tape reel according to the present invention in the molded condition.
Figure 2:
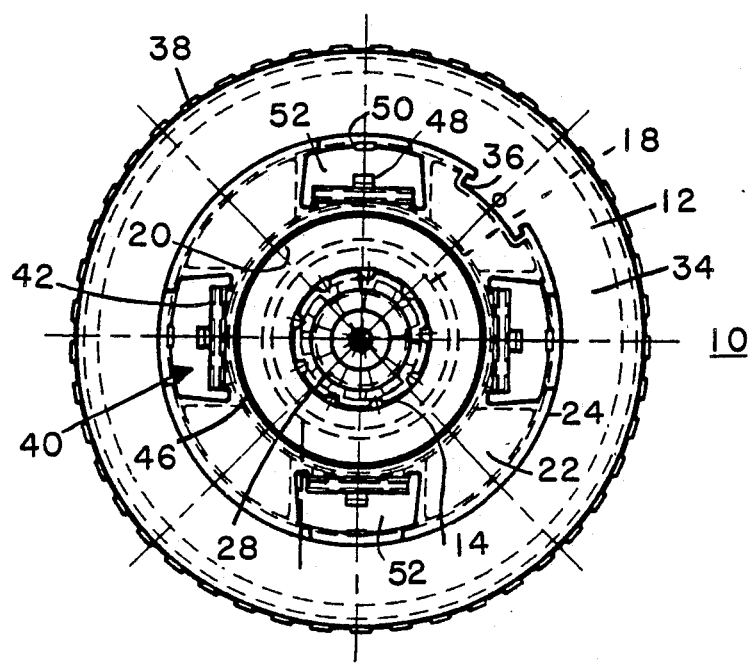
FIG. 2 is a top, view illustrating the tape reel shown in FIG. 1.
Figure 3:
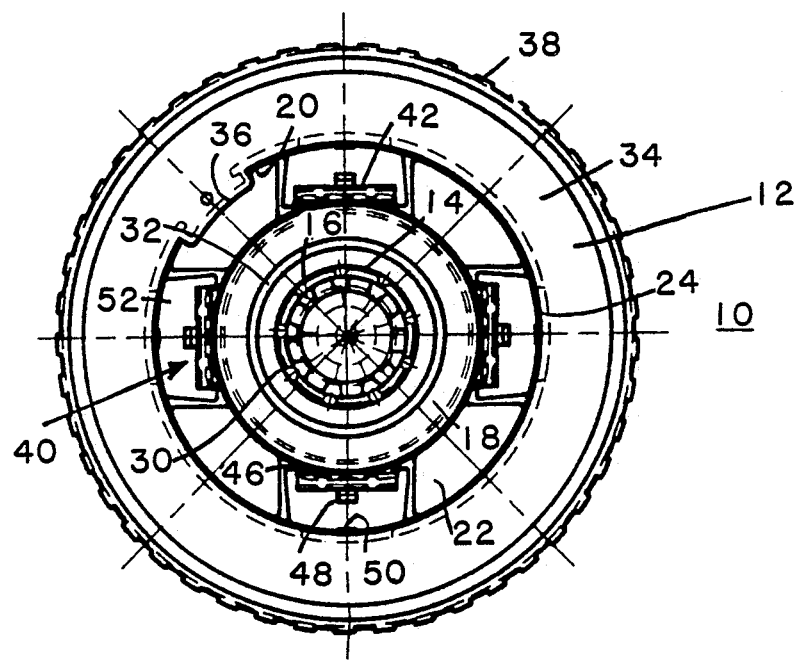
FIG. 3 is a bottom view illustrating the tape reel shown in FIG. 1.

Reference is made to FIGS. 1-3, illustrating the tape reel according to the present invention in the molded condition, denominated generally by reference numeral 10. The tape reel 10 can be made of, e.g., polypropylene. This tape reel 10 includes a hub 12 having a circular cross section core 14. The core 14 is hollow, and includes ribs 16 on the inside of a wall 17 thereof to receive drive spindles of the cassette player/recorder (not shown). The core 14 includes, at a lower portion 30 thereof, a perpendicular annular wall 18 and at least one annular ring 30 which facilitates the leveling of the tape reel 10 on the video cassette base (not shown). Projecting perpendicularly upward from the annular wall 18, and parallel to the wall 17 forming the core 14, is a circular cross section wall 20. Connected to the circular cross section wall 20 is a horizontal annular wall 22 which is parallel to wall 18. Further, connected to the horizontal annular wall 22 is another circular cross sectional wall 24 which is also parallel to the circular cross sectional wall 20.

The wall 24 includes a receptacle 56 for receiving the beginning of the tape (not shown) therein and a tape retaining means such as a cam lock(not shown) which is known in the art. Alternatively, the tape may be connected to the hub 12 by ultrasonic staking, as known in the art.

A lower, continuous, planar flange 34 is formed integrally of the circular cross sectional wall 24, perpendicular thereto and co-planar to the wall 18. The lower flange 34 may include a plurality of perimeter teeth 38 which cooperate with a locking device to prevent the reels from moving and unraveling tape when the tape cassette is not in use, as is known in the art.

The core 14 includes at an upper portion 28 thereof, a pivot button 26. This pivot button 26 is preferably integrally formed of the upper portion 28 of the core 14 as shown in FIG. 1, but could instead be formed as a separate member and attached to the upper portion 28 of the core 14.

Instead of the conventional upper flange, the present invention uses tape retaining means 40 in the form of a plurality of movable petals or ears 42 formed integrally at the intersection of the circular cross section wall 20 and horizontal annular wall 22. That is, to simplify the molding process and assure a smooth profile on the hub core outer diameter, wall 24, the present invention uses the upper tape containment ears 42 in a vertical stance. Ears 42 are positioned to eliminate the need for side actions or parting lines (which, as described above, are detrimental to the hub core outer diameter surface) and to compliment the standard vertical molding direction "A".

Each ear 42 is preferably a tongue shaped member having a wider base 43 than the free end, and a rounded free end 44. Each ear 42 is tapered or radiused along its length, i.e., it is narrower at its free end 44 than at the base 43. This tapering facilitates tape winding since the area at which the tape first comes in contact with the tape reel is widest and narrows towards the core 14 axis. In addition, the tape experiences only a smooth curved surface, no sharp edges.

Each ear 42 is connected to the hub 12 by movement means 46 such as a living hinge. As known in the art, a living hinge can be formed, e.g., by flexing a polypropylene joint after molding but while still warm.

Figure 4:
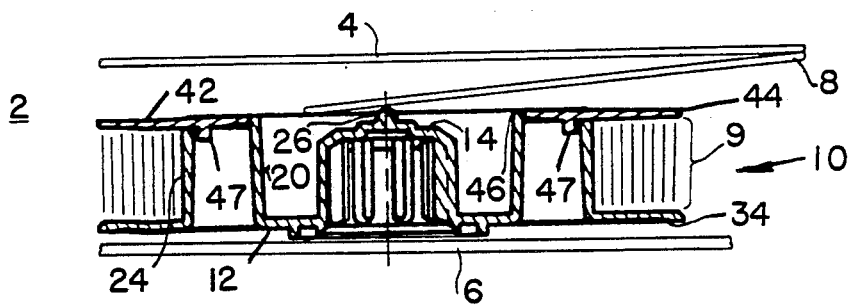
FIG. 4 is a side, cross sectional view illustrating the first embodiment of the tape reel according to the present invention in the assembled position within a tape cassette.
Figure 5:
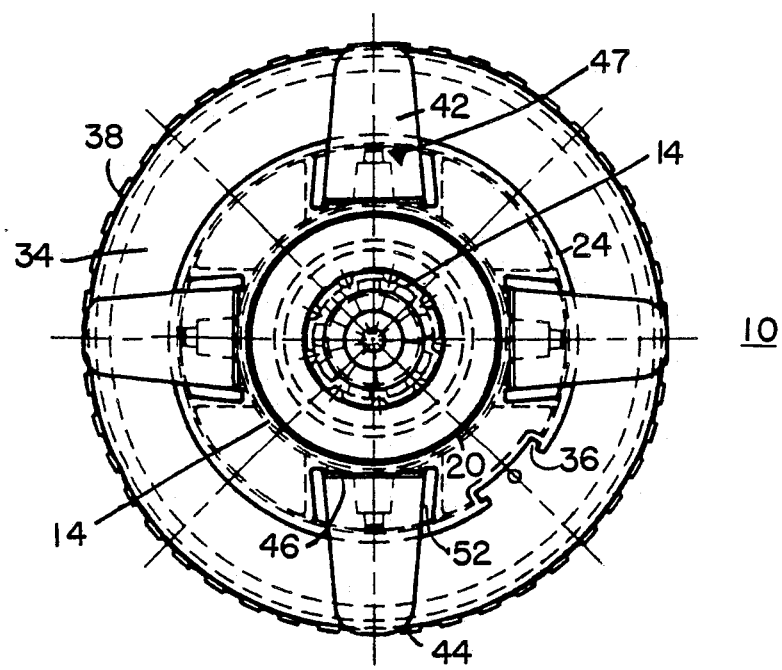
FIG. 5 is a top view illustrating the tape reel shown in FIG. 4.
Figure 6:
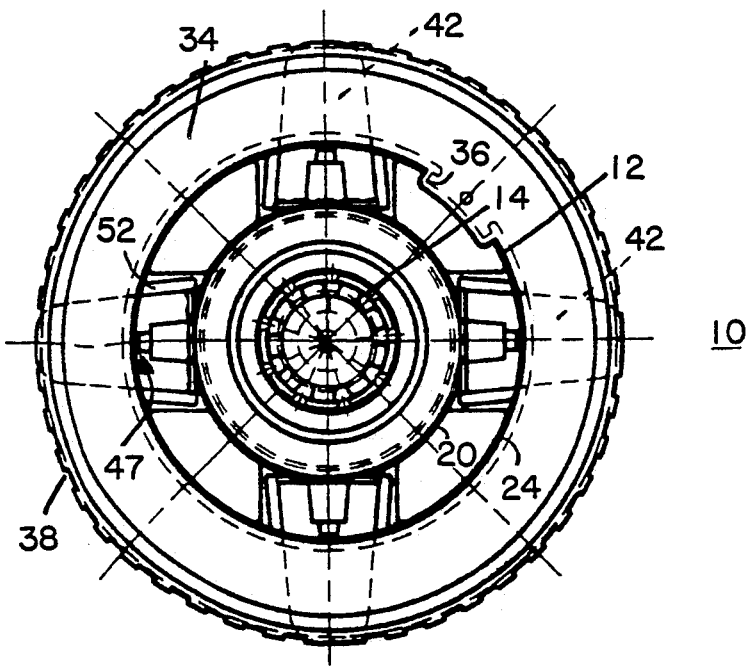
FIG. 6 is a bottom view illustrating the tape reel shown in FIG. 4.

The ears 42 are movable particularly between a first molded position shown in FIGS. 1-3 and 7-8, and a second assembled position shown in FIGS. 4-6. Also, the ears 42 can, of course, be bent backwards towards the core 14 axis, although this would not serve a functional purpose. Further, an opening 52 is formed within the core 14 partially around each ear 42.

FIGS. 4-6 show the tape reel 10 of the present invention in the assembled condition within a tape cassette 2. The tape cassette includes, as widely known in the art, a cover 4, a base 6 and a reel leaf spring 8 extending from the cover 4 to bias the reel 10 downwardly.

Before tape 9 is loaded on the tape reel 10, the ears 42 are pushed downward toward, and put into a parallel condition with, the lower flange 34 during automated assembly, and held in place by fastening means 47. The fastening means 47 may include a hooked fastening member 48 formed on the ear 42, which catches and cooperates with a fastening member 50 formed on the hub 12. Of course, the location and configuration of the fastening means 47 can be modified as desired.

As shown in FIGS. 7 and 8, after ejection from the mold, the ears 42 are pushed against a conical or like jig (not shown), forcing the ears 42 in a radial direction "B" to a snapped down or assembled position. Again, hinge 46 allows movement from the molded to assembled position. Containment of each ear 42 is achieved by fastening means 47 in the form of one center snap 53, a ledge 56, two side snaps 54, two projecting restraints 58, a protuberance 60 and a groove 62. The center snap 53 must overcome ledge 56, side snaps 54 force under the two projecting restraints 58 and protuberance 60 rides into groove 62. Because hinge 46 is delicate, protuberance 60 assures the ears 42 will hinge and rest at the same position every time. Also the relationship between the protuberance 60 and groove 62 acts as a horizontal stop for ear 42 when center snap 53 is in contact with ledge 56.

It has been observed that when tape is wound on the tape reel, force is exerted on the diameter of the hub 12, which actually enhances the ability of the fastening means 47 to retain the ears 42.

In summary, the tape reel 10 according to the present invention, because the ears 42 are formed in an upright position during molding, can be formed by using a standard mold (cavity and core) without side action. As a result, the standard mold of the prior art requiring side action for making a one-piece tape reel is eliminated. By eliminating the two-part mold, the side action procedure and the vestigial parting line, which had interfered with proper tape winding, can also be eliminated. Most particularly, with no parting line, the tape can be efficiently and properly wound.

As also can be seen, the present invention is a distinct improvement over the conventional and widely adopted multi-piece tape reel design. First, the amount of raw materials needed is reduced. For example, instead of a single upper continuous flange, smaller, spaced, ears 42 are used. An additional cost savings is available due to the type of material used. Preferably, the tape reel of this invention is molded of polypropylene. The material has the wear and flex properties necessary for creating living hinges, but is less expensive than acetal. Second, the entire tape reel 10 is made in a single molding process. Thus, the various handling, assembly and welding steps of the prior art are eliminated. Third, if it is desired to make the entire tape reel 10 including the pivot button 26, out of a low friction material, such as acetal, this can be done in one easy step. Alternatively, if it is desired to make only the pivot button 26 out of the low friction material, this pivot button 26 can be made separately and attached to the hub 12, and the rest of the one-piece tape reel 10 can be produced of a less expensive plastic.

An added benefit of the present invention is that the ears 42 can just as easily be returned to the molded condition as they are moved from the molded to the assembled condition. For example, if it is found that a defect has occurred in the winding of tape during manufacture, the ears merely need to be lifted, the tape removed and the tape reel can be reused. With the conventional tape reel, the tape would have to be unwound.

Of course, there are many variations to the described invention which falls within the scope thereof. For example, the number of ears does not have to be four. It is believed that such a tape reel including three ears, as shown in FIG. 9, would be preferred since such a configuration would appear to offer the most tape surface area coverage. Of course, five ears could also be used. Further, the sizes of the ears 42 can be varied as desired. In any case, one must balance the economies of using a small ear and fewer ears with the need to properly retain the tape wound on the tape reel 10. Finally, although plastic molding is preferred, the ears can be made separately and attached to the hub, perhaps with both parts being made of aluminum, if desired.

Alternatively, the ears are also an improvement over the prior art if used with a hub to which a separate, lower flange is attached. That is, the entire tape reel does not have to be molded integrally to benefit from the ears of this invention.

Finally, although this description emphasizes ears replacing a single flange, the ears of the present invention can also be molded on the top and bottom of the hub, thereby eliminating the need for the continuous lower flange and saving still further material expenses.

The above described tape reel has been shown to be of the type intended for use in video tape recorders. However, the invention can be similarly applied to tape reels for use in audio or other recording and/or reproducing apparatus.

The foregoing is considered illustrative only of the principles of the invention. Further, since numerous other modifications and changes will readily occur to those skilled in the art, it is not desired to limit the invention to the exact construction and operation shown and described. Accordingly, all suitable modifications and equivalents may be resorted to that fall within the scope of the invention and the appended claims.

We claim:
1. A plastic molded tape reel, comprising:
 (a) a cylindrical hub having a smooth, continuous, outer diameter surface, a first, lower end and a second, upper end;
 (b) first means for retaining wound tape formed at the first, lower end; and
 (c) second means for retaining the wound tape formed at the second, upper end, which means includes a plurality of planar ears molded in a first position parallel to a central axis of the cylindrical hub, and movable into a second assembled position perpendicular to the central axis of the hub.

2. The tape reel as recited in claim 1, further comprising:
 third means for allowing movement of the second means from the first molded position to the second assembled position.

3. The tape reel as recited in claim 2, wherein the third means for allowing movement is a living hinge formed between the second means and the second, upper end of the hub.

4. The tape reel as recited in claim 3, further comprising:
 a pivot button integrally formed in the second, upper end of the hub.

5. The tape reel as recited in claim 3, further comprising:
 a pivot button which is formed separately from the hub and is attached to the second, upper end of the hub.

6. A plastic tape reel molded as one piece, comprising:
 (a) a cylindrical hub having a smooth, continuous, outer diameter surface, a first, lower end and a second, upper end;
 (b) a planar flange connected to the first, lower end; and
 (c) means for retaining wound tape formed at the second, upper end which means is molded in a first position parallel to a central axis of the cylindrical hub, and movable into a second assembled position perpendicular to the central axis of the hub.

7. The tape reel as recited in claim 6, wherein the retaining means comprises:
 a plurality of planar ears.

8. The tape reel as recited in claim 7, further comprising:
 means for allowing movement of the plurality of ears from the first molded position to the second assembled position.

9. The tape reel as recited in claim 8, wherein the means for allowing movement is a living hinge formed between each ear and the second, upper end of the hub.

10. The tape reel as recited in claim 7, further comprising:
 means, formed on the second, upper end of the hub and each ear, for fastening the plurality of ears in the second assembled position.

11. The tape reel as recited in claim 10, wherein the fastening means is a projection formed on each ear and a corresponding, interengaging projection formed on the hub.

12. The tape reel as recited in claim 6, further comprising:
 a pivot button integrally formed in the second, upper end of the hub.

13. The tape reel as recited in claim 6, further comprising:
 a pivot button formed separately from the hub and attached to the second, upper end of the hub.

14. A cassette in which tape is wound, comprising:
 (a) a cassette base;
 (b) a cassette cover; and
 (c) a plastic molded tape reel rotatably positioned between the cassette base and cassette cover, the tape reel being molded as one-piece and including (i) a cylindrical hub having a smooth, continuous, outer diameter surface, a first, lower end and a second, upper end, (ii) a planar flange connected to the first, lower end, and (iii) means for retaining wound tape formed at the second, upper end, which means is molded in a first position parallel to a central axis of the cylindrical hub, and movable into a second, assembled position perpendicular to the central axis of the hub, wherein the retaining means is in the second, assembled condition in the cassette and the tape is wound between the flange and the retaining means.

15. The tape cassette as recited in claim 14, wherein the retaining means is a plurality of ears.

16. The tape cassette as recited in claim 15, wherein the tape reel further comprises:

means for allowing movement of the plurality of ears from the first molded position to the second assembled position.

17. The tape cassette as recited in claim 16, wherein the means for allowing movement between the first molded position and the second assembled position is a living hinge formed between each ear and the second, upper end of the hub.

18. The tape cassette as recited in claim 15, wherein the tape reel further comprises:

means, formed on the second, upper end of the hub and each ear, for fastening the plurality of ears in the second assembled position.

19. The tape cassette as recited in claim 18, wherein the fastening means is a projection formed on each ear and a corresponding, interengaging projection formed on the hub.

20. The tape cassette as recited in claim 14, further comprising:

a pivot button integrally formed in the second, upper end of the hub.

21. The tape cassette as recited in claim 14, further comprising:

a pivot button formed separately from the hub and attached to the second, upper end of the hub.

22. A method for manufacturing a tape reel, comprising the steps of:

plastic molding as one-piece the tape reel by forming a cylindrical hub having a smooth, continuous, outer diameter surface, a first, lower end, a second, upper end, a planar flange connected to the first, lower end, and means for retaining wound tape formed at the second, upper end which means is molded in a first position parallel to a central axis of the cylindrical hub, by moving each piece of a two piece mold in directions colinear with the axis of the cylindrical hub, and which means is movable between the first molded position to a second assembled position perpendicular to the central axis of the hub.

23. A method for manufacturing a cassette in which tape is wound, comprising the steps of:

(a) forming a cassette base;

(b) forming a cassette cover; and (c) forming a tape reel for rotatable positioning between the cassette base and cassette cover, the tape reel being plastic molded as one-piece, this step including the substeps by (i) forming a cylindrical hub having a smooth, continuous, outer diameter surface, a first, lower end, a second, upper end, and a planar flange connected to the first, lower end, and (ii) forming means for retaining wound tape formed at the second, upper end which mans is molded in a first position parallel to a central axis of the cylindrical hub, by moving each piece of a two piece mold in directions colinear with the axis of the cylindrical hub and which means is movable between the first, molded position and a second, assembled position perpendicular to the central axis of the hub;

(d) moving the retaining means into the second, assembled condition; and (e) winding the tape between the planar flange and the retaining means.

* * * * *